(12) United States Patent
Cutler et al.

(10) Patent No.: US 6,903,320 B2
(45) Date of Patent: Jun. 7, 2005

(54) DIFFERENTIAL TEMPERATURE MICROWAVABLE CONTAINER

(75) Inventors: Brent L. Cutler, Vernon, CA (US); Gary N. Chisholm, Rancho Palos Verdes, CA (US)

(73) Assignee: Mars, Incorporated, McLean, VA (US)

(*) Notice: Subject to any disclaimer, the term of this patent is extended or adjusted under 35 U.S.C. 154(b) by 133 days.

(21) Appl. No.: 10/315,456

(22) Filed: Dec. 10, 2002

(65) Prior Publication Data
US 2004/0108313 A1 Jun. 10, 2004

(51) Int. Cl.⁷ .......................... H05B 6/68; A21D 10/02
(52) U.S. Cl. ...................................... 219/730; 426/109
(58) Field of Search ........................... 219/730, 736, 219/725, 729, 634, 759; 426/109, 107, 241, 243; 99/DIG. 14

(56) References Cited

U.S. PATENT DOCUMENTS

| | | | |
|---|---|---|---|
| 4,076,790 A | | 2/1978 | Lind |
| 4,081,646 A | | 3/1978 | Goltsos |
| 4,233,325 A | | 11/1980 | Slangan et al. |
| 4,318,935 A | | 3/1982 | Stussi |
| 4,789,552 A | | 12/1988 | Speakman et al. |
| 4,794,008 A | | 12/1988 | Schmidt et al. |
| 4,894,503 A | | 1/1990 | Wendt |
| 4,904,324 A | | 2/1990 | Heider |
| 4,923,704 A | * | 5/1990 | Levinson .................. 426/243 |
| 4,926,020 A | | 5/1990 | Atwell et al. |
| 4,962,293 A | * | 10/1990 | Lackey ....................... 219/730 |
| 4,988,841 A | | 1/1991 | Pesheck et al. |
| 4,992,638 A | * | 2/1991 | Hewitt et al. ............... 219/728 |
| 5,101,084 A | | 3/1992 | Atwell et al. |
| 5,104,306 A | | 4/1992 | Gordon et al. |
| 5,121,913 A | * | 6/1992 | Klinedinst et al. ............ 271/91 |
| 5,256,365 A | * | 10/1993 | Gordon et al. .............. 264/509 |
| 5,322,182 A | * | 6/1994 | Fritz .......................... 220/623 |
| 5,718,370 A | | 2/1998 | Lafferty et al. |
| 5,910,268 A | * | 6/1999 | Keefer ........................ 219/728 |
| 6,077,551 A | * | 6/2000 | Scrimager ................... 426/107 |
| 6,476,368 B2 | * | 11/2002 | Aronsson et al. ........... 219/730 |
| 6,501,059 B1 | * | 12/2002 | Mast ........................... 219/730 |
| 6,627,862 B1 | * | 9/2003 | Pedersen .................... 219/730 |
| 6,683,289 B2 | * | 1/2004 | Whitmore et al. .......... 219/730 |
| 6,710,315 B2 | * | 3/2004 | Chisholm .................... 219/730 |
| 2001/0019761 A1 | | 9/2001 | Iriyama |

FOREIGN PATENT DOCUMENTS

| | | |
|---|---|---|
| EP | 0 492 052 B1 | 5/1997 |
| WO | WO 02/062552 A1 | 8/2002 |

* cited by examiner

*Primary Examiner*—Daniel Robinson
(74) *Attorney, Agent, or Firm*—Fulbright & Jaworski LLP

(57) ABSTRACT

The present invention is directed to a molded microwaveable frozen food container having at least a first section and a second section in which at least one of the sections includes an in-mold label. The in-mold label provides at least one of the sections with a susceptor zone. In one embodiment of the inventive container, a first section of the container can include the in-mold label providing the susceptor zone and a second section of the container can include the in-mold label providing a shielding zone. Alternatively, the first section can include a shielding zone and the second section can include the susceptor zone or three sections can be provided have a combination of shielding and susceptor zones.

25 Claims, 4 Drawing Sheets

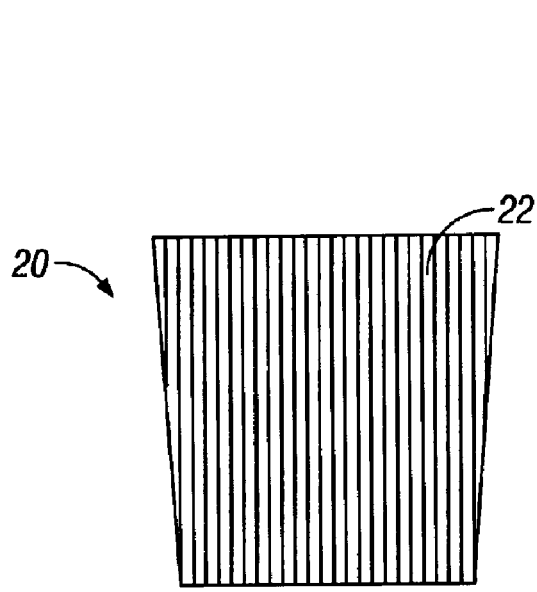
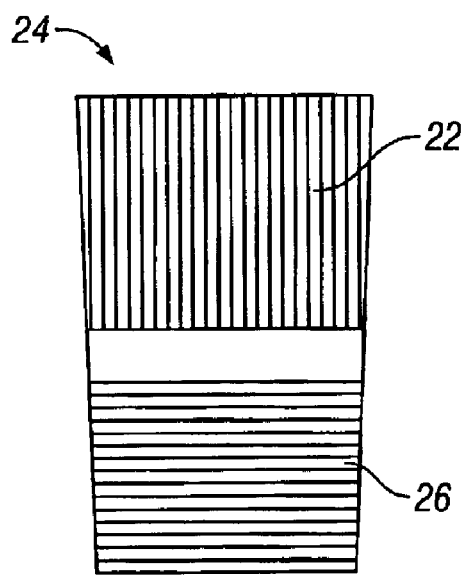
*FIG. 4*  *FIG. 5*
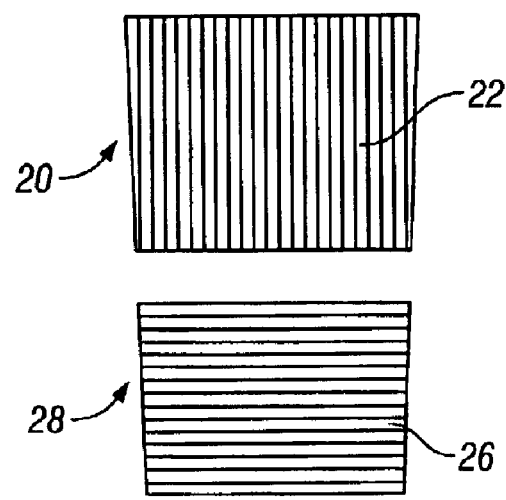
*FIG. 6*

DIFFERENTIAL TEMPERATURE MICROWAVABLE CONTAINER

TECHNICAL FIELD

The present invention relates to a container and process for forming a frozen food product container, and more particularly, a process of making the container that utilizes an in-mold labeling system in which the container allows thawing only of a component intended to be thawed and/or heated while the other component remains substantially frozen when subject to microwave heating.

BACKGROUND OF THE INVENTION

A number of frozen food packages are known containing a food portion intended to remain frozen such as frozen desserts and another food portion intended to be thawed, melted or heated. Multi-component containers have also been manufactured with a variety of constructions that allow sections of the container to be exposed to microwave energy while shielding other sections from microwave energy.

U.S. Pat. No. 4,233,325 issued to Slangan et al. discloses one such microwaveable multi-compartment package. This package includes a lower compartment, containing frozen ice cream, which is substantially impermeable to microwave energy and an upper compartment, containing frozen syrup, which is microwave permeable. The package is placed in a microwave oven to melt the frozen syrup in the upper compartment. The two compartments are manufactured from separate cardboard blanks, formed and then fit together. U.S. Pat. No. 4,794,008 issued to Schmidt et al describes an upper frozen food compartment permeable to microwave energy formed from plastic and a lower frozen food compartment constructed from a microwave reflective material such as foil. The compartments are formed into U-shaped plastic compartments and joined together to form a single multi-compartment food package. The two compartments must be further separated from one another after heating in order to access the food contained within the compartments.

U.S. Pat. No. 4,081,646 issued to Goltsos discloses a multi-compartment heating container including a tray and cover that is thermo-formed from plastic which is transparent to microwave energy. The outer surfaces of the tray and cover may be shielded against the microwave energy by a thin film of radiation-opaque material, except for regions which are intended to define microwave-transparent openings. Each compartment in this container is shielded against different amounts of microwave energy by leaving different sized windows on each compartment free from the radiation-opaque material. U.S. Pat. No. 5,718,370 also discloses a partially shielded microwave heating container having a first compartment shielded from microwave energy and a second compartment permeable by microwave energy. The first compartment includes a layer of microwave shielding material laminated to a portion of the sheet of microwave permeable paperboard material that forms the container.

U.S. Pat. No. 4,894,503 discloses packaging materials for heating food in a microwave oven that includes metal shielding or other metal components which cause a gain in electric field strength that is greater than 3. Preferably, the packaging is formed from high density polyethylene or polypropylene or co-polymers thereof. U.S. Pat. No 4,926,020 discloses a method and food product structure that allows for the controlled heating of multi-component foods in a microwave oven. A layer of an edible substance with preselected properties and positioned adjacent to one or more food items is used as a shield to control the amount of transmitted microwave power to the adjacent food.

In-mold labeling methods and apparatus are also known. For example, U.S. Pat. Nos. 5,104,306; 5,121,913 and 5,256,365 all describe methods and apparatus for labeling mold cavities in blow-molding machines. U.S. Pat. No. 4,904,324 discloses a method of making and labeling a plastic container by applying the label during the blow molding of the plastic container. A multilayer label is positioned in a mold cavity with the outer layer of the label in contact with the mold. During the molding process, the non-cellular inner layer of the label becomes bonded to the outer surface of the container. EP 0492052 describes a method of producing an in-mold labeled vessel having an elongated bottom projection integral with the vessel bottom. The label of this method has a bottom portion and wall portions that cover essentially the entire outside surface of the vessel.

U.S. Pat. No. 4,076,790 discloses a method of incorporating a pre-cut foil sheet in a container injection molded from thermoplastic material. The foil sheet can be located on either the inner surface or outer surface of the container to serve as a diffusion barrier or label. The foil sheet can completely cover the inside or outside of the container, it can cover the bottom and two opposing sides of the container, or it can cover the bottom, two opposing sides and one-half of the remaining two opposing sides. U.S. Patent Application Publication U.S. 2001/0019861 describes a laminated decorative sheet for in-mold decorating injection molding. The laminated decorative sheet has a resin layer containing an acrylic-modified polyolefin resin that is placed into contact with an injection-molded resin molding. The decorative sheet covers the outer surface of a resin mold object. WO 02/062552 describes a method for manufacturing a diffusion-tight plastic container using a film material having barrier properties. The film material label is pre-cut and pre-shaped prior to placing the label into a mold that has an inner surface corresponding to the outer surface of the plastic container to be manufactured. The label forms the outer surface of the container. The above references are fully incorporated herein by reference.

It would be desirable to have a container that includes a microwave permeable section and a microwave shielded section, formed from a single rigid or semi-rigid container that is configured to provide for at least a susceptor and a shielding zone.

Another object of the present invention is to provide a single rigid or semi-rigid container formed by molding technology in which the container has at least a section that is permeable by microwave energy and at one other section that is reflective to microwave energy that utilizes in-mold labeling systems to provide for the susceptor and a shielding zones.

It is yet another object of the present invention is to provide a microwave heating container partially shielded against microwaves that is formed from a single rigid or semi-rigid mold with a microwave reflective material incorporated on only a portion of the mold.

It would also be advantageous to provide a single rigid or semi-rigid container formed by molding technology in which the container has at least one section that is permeable by microwave energy and at least one other section that is reflective to microwave energy in which the container, upon being opened, can also be used to hold the food product while being eaten.

BRIEF SUMMARY OF THE INVENTION

The present invention is directed to a molded microwaveable frozen food container having at least a first section and a second section in which at least one of the sections includes an in-mold label. The in-mold label provides at least one of the sections with a susceptor zone. In one embodiment of the inventive container, the first section of the container includes the in-mold label providing the susceptor zone and the second section of the container includes the in-mold label providing a shielding zone. Alternatively, the first section can include a shielding zone and the second section can include the susceptor zone.

The present invention is also directed to process for forming a differential temperature microwaveable container. The process includes the steps of: providing in-mold labels configured to be permeable to microwave energy; transferring the in-mold labels to preselected areas of container mold sections of a molding apparatus; molding one or more containers in the molding apparatus; filling the molded containers with at least a first and second food component; and securing a cover to each of the plurality of containers.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 4 illustrates an in-mold label having a susceptor surface;

FIG. 5 illustrates an in-mold label having both a susceptor surface and a shielding surface;

FIG. 6 illustrates an in-mold label set including a susceptor label and a shielding label;

DETAILED DESCRIPTION OF THE INVENTION

The present invention relates to a container and process for forming the frozen food product container. The process of making the container utilizes an in-mold labeling system in which the container allows thawing only of a component intended to be thawed and/or heated while another component remains substantially frozen when subject to microwave heating. In a further aspect, the invention relates to such a container which, on simply being opened, can also be used to hold the food product while it is eaten.

Figure 1:
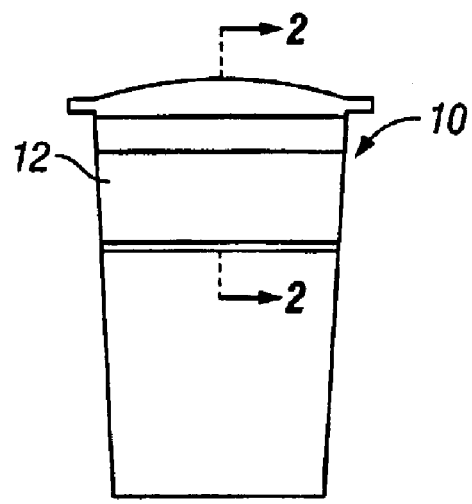
FIG. 1 is a perspective view of a container of the present invention illustrating a container having one in-mold label.
Figure 1A:
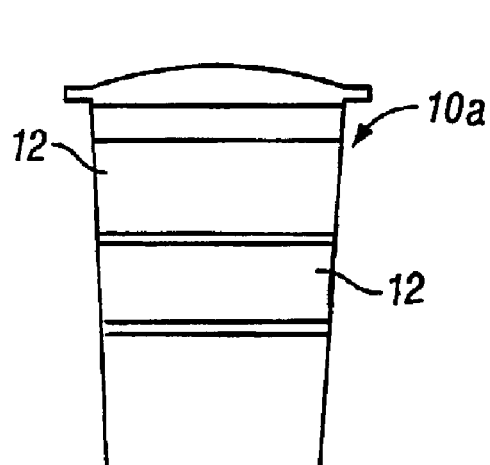
FIG. 1a is a perspective view of a container of the present invention illustration a container having two in-mold labels.

The inventive container 10 is able to provide for differential temperatures during microwave heating through the use of one or more shielded zones to keep a food product frozen or cold and one or more susceptor zones to heat a food product by microwave radiation. An in-mold labeling system used in conjunction with various molding processes provides the shielding and susceptor zones on the container by means of an in-mold label 12. By example only, container 10 of FIG. 1 illustrates a container having one in-mold label 12 that creates two zones and container 10a of FIG. 1a illustrates a container have two in-mold labels 12 that creates three zones. The in-mold labels 12 can provide any combination of susceptor and shielded zones. The section including the in-mold label providing the susceptor zone can be positioned in the first section, the second section, a third section or any two sections of the container. The in-mold label providing the shielding zone can be positioned in the first section, the second section, a third section or any two sections of the container.

Figure 7:
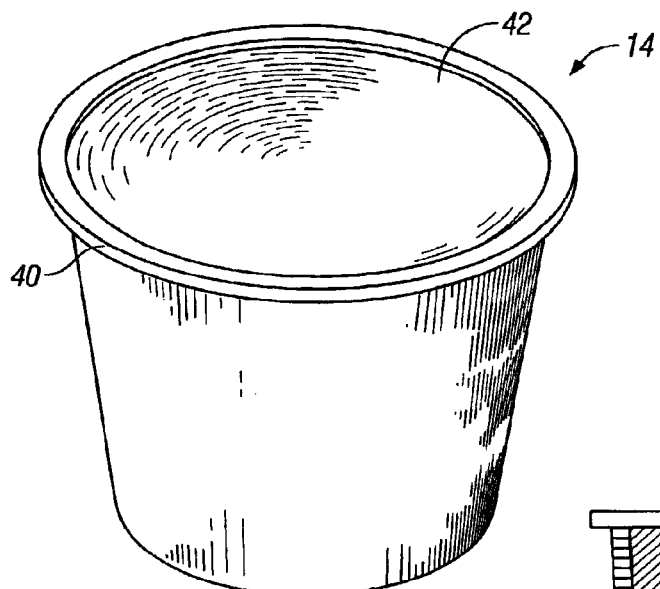
FIG. 7 is a perspective view one embodiment of the container of the present invention.

The container 10 can be provided in a variety of shapes, such as a cylindrical shaped container 14 (FIG. 7) or a square or rectangular shaped tray or pan 16 with a peelable lid 18 (FIG. 10) that can be formed by means of known molding technology such as injection molding, blow molding or thermo-forming. Injection molding processing utilizes an injection molding machine and an injection mold in which the injection molding machine melts the plastic material and injects the molten material into the cavity of the mold. In blow molding processes, the plastic material typically is mixed in an extrusion device and then blown into the molds by means of an extrusion nozzle. In thermo-forming processing, an extruded web of thermoplastic material passes directly from an extrusion die to a thermoforming apparatus that includes molds for forming the product from the web. All of these processes are well known to one skilled in the art of molding.

Preferably, the molded containers of the present invention are formed from a plastic such as polyethylene terephthalate or any high temperature specialty resins that will withstand the high temperatures created by the susceptor surface when subject to microwave energy.

The present invention utilizes known in-mold labeling processes. Typically, labels are supplied to the mold sections of injection molds, blow molds or thermo-forming molds by an in-mold labeling apparatus having transfer heads that engage and move the labels from a label pick up position to a label transfer position for subsequent placement in the cavities of the mold sections. The labels can be placed in the molds so as to be positioned on either the inside or outside surface of the molded container. For example, in-mold labeling processes are described in U.S. Pat. No. 4,904,324, EP 0492052 and WO 02/062552 which are incorporated herein by reference.

The inventive container 10 can include a single in-mold label 20 providing only a susceptor zone 22 (FIG. 4) or a single label 24 providing both a susceptor zone 22 and a shielding zone 26 (FIG. 5). Alternatively, two in-mold labels can be used in which one label 20 provides the susceptor zone 22 and the other label 28 provides the shielding zone 26 (FIG. 6). In an alternate embodiment, two in-mold labels can be used to provide two susceptor zones and a third in-mold label can be used to provide a shielding zone. Additionally, any combination of in-mold labels can be configured to provide several susceptor zones and several shielding zones (FIG. 1a).

Figure 2:
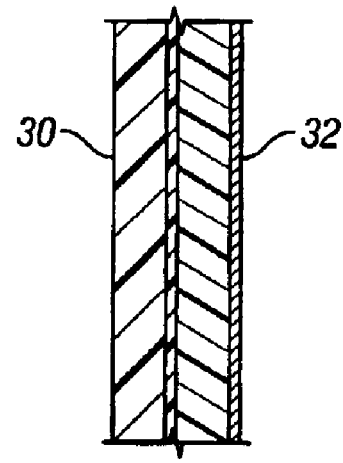
FIG. 2 is a cross sectional view of the in-mold label of FIG. 1 along lines 2—2 illustrating a susceptor surface.
Figure 3:
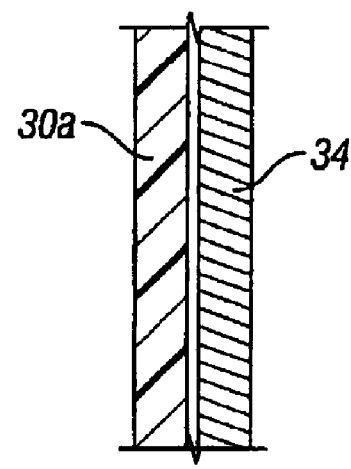
FIG. 3 is a cross sectional view of the in-mold label of FIG. 1 along lines 2—2 illustrating a shielding surface.

The conversion of labelstock into labels for in-mold labeling involves the printing, sheeting, stacking, and die-cutting of the labelstock on a high type die cutter. The labelstock 30 can be of any suitable material appropriate for in-mold labeling systems. In the present invention, labelstock 30 could consist of a single layer with an attached susceptor film 32 (FIG. 2) or the labelstock 30 could consist of a first layer that may be printable (not shown) and a second layer that includes the attached susceptor film. Alternatively, commercially available susceptor film 32 can be used as the labelstock without an additional layer of plastic or paper. Other labelstock can be provided that will include shielding or thermal insulation material 34 (FIG. 3). For example, this labelstock could include a layer of metal foil. Labelstock can also consist of a section of susceptor film 32 and an adjacent and parallel section of shielding material 34 (label 24 of FIG. 5)

Susceptor film is known to one skilled in the art and is formed from a substrate upon which a coating for absorption of microwave radiation is deposited, printed, extruded, sputtered, evaporated, or laminated. Susceptor film may include a pattern that is specific for a particular food item in order to heat the food item evenly. Various patterns include, but are not limited to square matrix, shower flower, hexagonal, slot matrix and or concentric circles. See U.S. Pat. Nos. 6,251,451; 6,114,679; 5,698,127; 5,038,009; 6,133,560; and 6,150,646 which are incorporated herein by reference. Susceptor patterns may also be used to create a label having both susceptor and shielding zones.

Suitable materials for the shielding or thermal insulation layer preferably include materials that are capable of being stored and handled at temperatures typical for frozen and/or chilled foods that can also be cooked in the package or container and materials that can be stored and microwaved. Shielding material can include metal foil or other microwave reflective material. Thermal insulating materials can include embossed paper, polystyrene foam, polypropylene foam, polyethylene terephthalate foam, or other similar types of plastic foam, poly-ester in any form or any high temperature specialty resins.

The container 10 or 10a of the present invention is formed by first providing appropriate labelstock that will include labelstock configured to be impermeable to microwave energy and labelstock configured to be permeable to microwave energy. An in-mold labeling apparatus die cuts and transfers the labels to preselected areas of the container mold sections of a molding apparatus. The molding apparatus molds one or more containers. The molding apparatus can be configured for injection molding, blow molding or thermoforming. After the containers have been molded, they are filled with at least a first and second food component and an appropriate lid or cover is secured to the top of the container. Thereafter, the containers may require additional processing and packaging may be applied to the containers.

In one embodiment, molded container 10 has a first section 36 for containing a first food component 37 and a second section 38 for containing a second food component 39. The susceptor zone 22 and the shielding zone 26 can be in either the first or the second section 36, 38 respectively of container 10 depending upon the placement of the in-mold labels. Alternatively, molded container 10a has a first section for containing a first food component, a second section for containing a second food component and a third section for containing a third food component.

In one embodiment of the invention, the first food component 37 can be a liquid when heated such as a chocolate or fruit syrup or fruit preserves and the second food component 39 can be ice cream, a frozen edible emulsion, frozen pudding or the like and the combination upon microwave heating produces a hot fudge sundae or similar product. In another embodiment, a first food component can be a chocolate or fruit syrup or fruit preserves, a second food component 39 can be ice cream, a frozen edible emulsion, frozen pudding or the like and a third food component can be a cake or pastry. Alternatively, a first component could be a cheese or tomato sauce and the second component could be a vegetable or pasta. A third food component could also be included.

Figure 8:
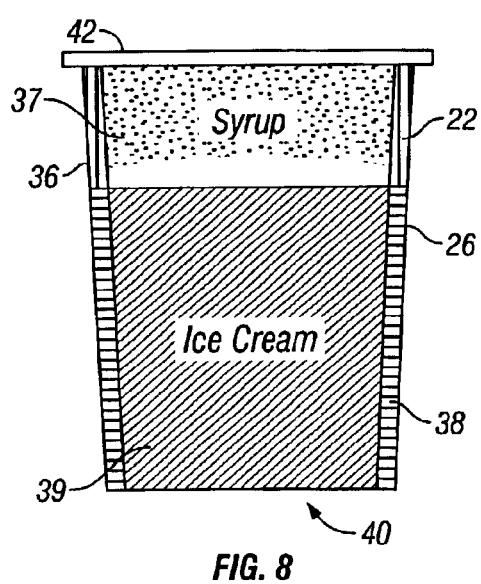
FIG. 8 is a cross sectional view of the container of FIG. 7 with a first and second food component.

FIG. 8 illustrates an embodiment of the present invention which includes a container 40 having a lid 42 secured to the top thereof in any suitable manner. The first section 36 of the container includes an in-mold label 20 that provides a susceptor zone 22 and the second section 38 of container 40 includes an in-mold label that provides a shielding zone 26. In this embodiment, the first section 36 contains a first food component 37 such as a syrup and the second section 38 contains a second food component 39 such as ice cream.

In another embodiment, the container 40 can include a single in-mold label 20 providing only a shielding zone 26. In this embodiment, container 40 would be subject to microwave heating with the lid 42 removed so that only the top of the container 40 would receive the microwave energy.

In another embodiment of the present invention, the first food component 37 can be ice cream, a frozen edible emulsion, frozen pudding or the like, and the second food component 39 can be solid when thawed or heated such as cake, brownie, pie, fruit cobbler or the like, and the combination upon microwave heating produces a pie ala mode, brownie ala mode or similar product.

Figure 9:
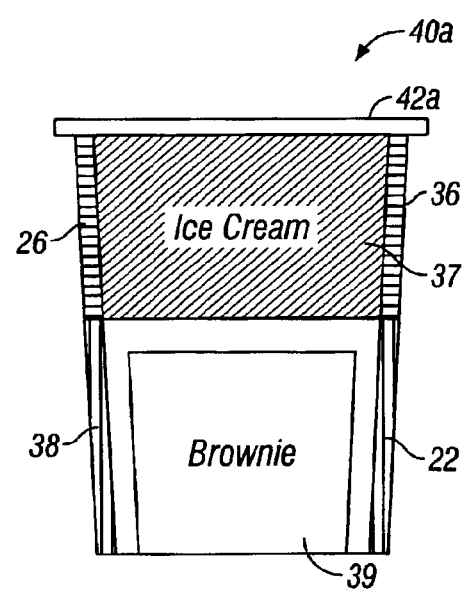
FIG. 9 is a cross sectional view of the container of FIG. 7 with an alternate first and second food component.

FIG. 9 illustrates container 40A having a lid 42A secured to the top thereof in any suitable manner. Lid 42A need not be metal if it includes a shielding layer. In this embodiment, the first section 36 contains a first food component 37 of ice cream, a frozen edible emulsion or frozen pudding and the second food component 39 is a cake, brownie, pie, or fruit cobbler. The first section 36 includes an in-mold label that provides a shielding or thermal insulating zone 26 and the second section 38 includes an in-mold label that provides a susceptor zone 22.

Figure 10:
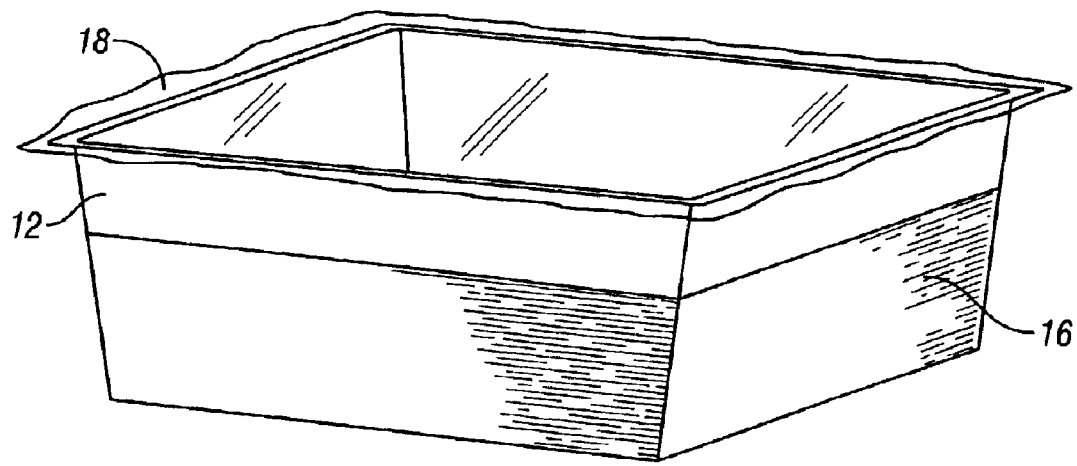
FIG. 10 is a perspective view of a second embodiment of the container of the present invention.
Figure 11:
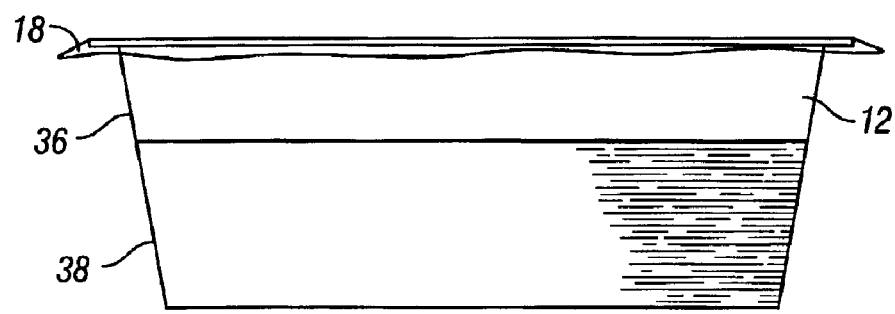
FIG. 11 is a front plan view of the container of FIG. 10.

FIGS. 10 and 11 illustrate a container 16 of the present invention that is in the shape of a square or rectangular pan with a peelable lid 18. The first section 36 of container 16 includes an in-mold label 20 that provides a susceptor zone 22. The second section 38 of container 16 is microwaveable permeable. In this embodiment, the first section 36 can contain a first food component 37 such as cheese or tomato sauce and the second section 38 can contains a second food component 39 a vegetable or pasta.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A microwaveable frozen food container comprising;
   a molded container having at least a first and a second section;
   at least one of the sections including an in-mold label;
   wherein the in-mold label provides at least one of the sections with a susceptor zone.

2. The container of claim 1, wherein the container has at least three sections.

3. The container of claim 1, wherein one of the sections includes the in-mold label providing the susceptor zone.

4. The container of claim 3, wherein the section including the in-mold label providing the susceptor zone is selected from the group consisting of the first section, the second section, a third section and any two sections of the container.

5. The container of claim 1, wherein a third section of the container includes an in-mold label providing a susceptor zone.

6. The container of claim 2, wherein at least two of the sections includes an in-mold label providing a susceptor zone.

7. The container of claim 1, wherein at least one of the sections includes an in-mold label providing a shielding zone.

8. The container of claim 7, wherein the in-mold label providing the shielding zone can be positioned in a section selected from the group consisting of the first section, the second section, a third section and any two sections of the container.

9. The container of claim 1 or 2, wherein at least one of the sections contain a food component selected from a group consisting of chocolate syrup, fruit syrup, fruit preserves, cheese sauce and tomato sauce.

10. The container of claim 1 or 2, wherein at least one of the sections contains a food component selected from a group consisting of ice cream, frozen edible emulsion, frozen pudding, vegetables and pasta.

11. The container of claim 1 or 2, wherein at least one of the sections contains a food component selected from a group consisting of cake, brownie, pie, and fruit cobbler.

12. The container of claim 1, wherein the in-mold label is positioned on either an outer surface or an inner surface of the molded container.

13. The container of claim 1, wherein the container is molded from a process selected from the group consisting of injection molding, blow molding and thermo-form molding.

14. The container of claim 1, wherein the molded container is formed from a polyethylene terephthalate material.

15. The container of claim 1, wherein the in-mold label includes a susceptor film layer.

16. The container of claim 1, wherein the in-mold label includes a susceptor film layer and an adjacent and parallel shielding layer.

17. A process for forming a differential temperature microwaveable container, comprising the steps of:
   a) providing in-mold labels configured to be permeable to microwave energy;
   b) transferring the in-mold labels to preselected areas of container mold sections of a molding apparatus;
   c) molding one or more containers in the molding apparatus
   d) filling the molded containers with at least a first and second food component; and
   e) securing a cover to each of the one or more containers.

18. The process of claim 17, wherein the in-mold label is positioned on either an outer surface or an inner surface of the molded container.

19. The process of claim 17, wherein the container is molded from a process selected from the group consisting of injection molding, blow molding and thermo-form molding.

20. The process of claim 17, wherein the molded container is formed from a polyethylene terephthalate material.

21. The process of claim 17, wherein the in-mold label includes a susceptor film layer.

22. The process of claim 17, wherein the in-mold label includes a susceptor film layer and an adjacent and parallel shielding layer.

23. The process of claim 17, wherein the in-mold label is comprised of susceptor film.

24. The process of claim 17, wherein the in-mold label includes a shielding layer.

25. The process of claim 17, wherein the container is provided with at least one susceptor zone and at least one shielding zone.

* * * * *